A. J. LOWELL.
MANUFACTURE OF TEA-KETTLES, &c.
No. 187,651.             Patented Feb. 20, 1877.
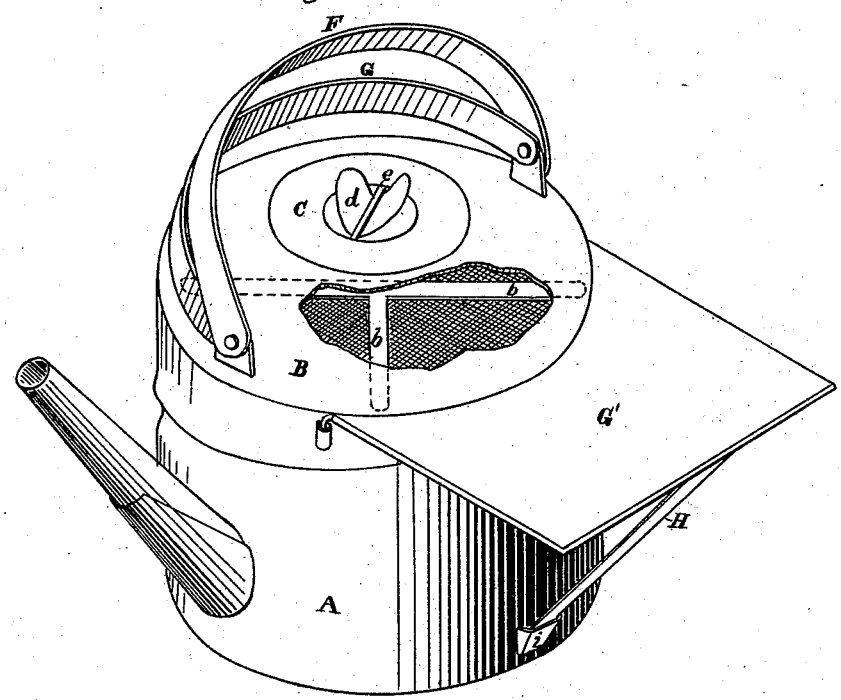
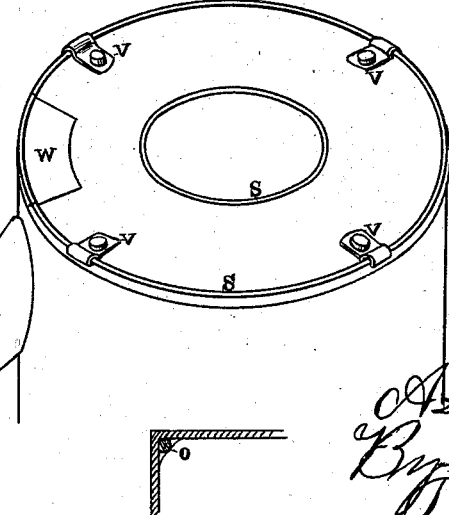
Witnesses
Geo. H. Strong
O. T. Stacy
Inventor
Azman Lowell
By his atty's
Dewey & Co.

UNITED STATES PATENT OFFICE.

AZMAN J. LOWELL, OF ALVARADO, CALIFORNIA.

IMPROVEMENT IN THE MANUFACTURE OF TEA-KETTLES, &c.

Specification forming part of Letters Patent No. 187,651, dated February 20, 1877; application filed December 11, 1876.

*To all whom it may concern:*

Be it known that I, A. J. LOWELL, of Alvarado, Alameda county, State of California, have invented Improvements in the Manufacture of Tea-Kettles and other Tinware; and I do hereby declare the following description and accompanying drawings are sufficient to enable any person skilled in the art or science to which it most nearly appertains to make and use my said invention without further invention or experiment.

My invention relates to certain improvements in tea-kettles, some of which improvements are also useful in the manufacture of other articles of tinware.

Referring to the accompanying drawings, in which Figure 1 is a perspective view of a tea-kettle with my improvements attached, and Fig. 2 is a perspective view of the bottom—

Let A represent the body of a tin tea-kettle. The top B of this kettle I make perfectly flat, as represented, and instead of making the opening through which the kettle is filled in the center of its top, where that opening is ordinarily made, I make it at one side of the center, so that I may be able to brace the flat top on its under side, in order to give it the requisite strength, for without some stay or support a flat top would yield to any slight pressure upon it. These braces or bridges *b* I make of tin by first forming a strip or piece of tin into a square tube, and then soldering it to the under side of the top B. One of these braces I extend diametrically across the under side of the top, close to the edge of the opening, and I can then employ any desired number of short braces to extend from this main brace to the side of the vessel. By making the opening at one side of the top I am able to brace or support the remaining flat surface in one piece, and to a better advantage than if I had to brace a narrow margin all around the opening; or, instead of the braces or bridges above described, I can stiffen or strengthen the flat top by grooving or beading it radially from the center of the top. The cover or lid C, which closes the opening in the top of the kettle, I make flat, and provide with a depression in its center, across which I secure a wire, *e*. To this wire I secure a piece of cloth, *d*, which will lie in the depression and not produce any projection on the top of the kettle. By constructing the top of the kettle flat it can be used for setting dishes of cooked victuals upon, in order to heat them or keep them warm.

To secure the ears to the top of the vessel I make a hole or narrow slot in the top where the ears are to be secured. I then pass the end of the ear through to the inside, bend it down, rivet it in place, and close the slot by soldering it up. I also provide two tin handles or bails, F G, for the kettle. The ends of one of these handles are secured inside of the ears of the kettle, while the ends of the other are secured outside of them, a single rivet passing through each ear, and fastening both handles.

The inside bail is slightly shorter than the outside one, so that when they are brought together the inside bail will fit inside of the outside one, and thus the two bails will form one handle, by means of which the kettle can be carried about. These handles can be separated and turned down upon the outer rim of the top, on opposite sides, thus providing a ring above the kettle, upon which dishes can be placed to keep them warm.

G is a detachable shelf, which I arrange to be attached to one side of the kettle on a plane with its top. One end of this platform or shelf is supported upon the edge of the top by suitable fastenings, while its opposite edge is supported by an angular brace, H, which is hinged to the shelf at one end, while its opposite end fits and is supported in a socket or pocket, *i*, which is formed on the side of the kettle near its bottom, or it can rest upon the stove, so as to form a supporting-leg. This platform is also useful and convenient for supporting any article or substance which it is desired to keep warm. I have also devised a protection for the inside angle, which is formed by the junction of the sides and bottoms of tin vessels where they are most liable to rust, and a protecting-base or continuous foot for them to rest upon, the object of which is to prevent the bottoms from wearing through by friction.

The inside angle I protect by placing a wire or other metallic strip, *o*, in it, and then securing it in place with solder, so as to fill the sharp corner or angle from which it is almost impossible to remove water after the vessel has been emptied. This prevents the angle from rusting, as it provides a thickness of non-corrosive material. I also provide a base or foot for the vessel by coiling a wire, s, around the outer edge of its bottom, and soldering it in place.

Either of these prtoections can be used independently of the other, but where both are used on the same vessel I employ a tin loop or strap, V, at short intervals, in the bight of which the wires are held. The meeting-edges of these straps point toward the center of the bottom, and the straps of the lower wire are placed directly below the straps of the upper wire, one wire being inside and the other outside of the vessel. I then punch a hole through both of the straps and the intervening bottom, and rivet them all together. After this I proceed to solder them, as above described.

Tin tea-kettles are worn out soonest at the corner of the bottom, directly below the spout, owing to their being frequently tipped forward in pouring water from the spout. In order to protect this point I place a re-enforce, w, over this edge, so that it will receive the wear.

These improvements enable me to produce a superior tea-kettle, or article of tinware. The re-enforce w simply adds to the wearing quality of the vessel, and renders it more salable, and is herein described only to show my complete plan of construction, and is not claimed.

Having described my invention, what I claim, and desire to secure by Letters Patent, is—

1. The tea-kettle A, having the flat top B, which is supported on the under side by braces or bridges b, substantially as and for the purpose described.

2. In combination with a tea-kettle, A, having a flat top, B, the flat lid or cover C, provided with a depression in its top, and having a handle, d, which is made of cloth, substantially as and for the purpose described.

3. A tea-kettle, A, or equivalent vessel, having two handles or bails, F G, arranged to serve as one single bail when brought together, and adapted to spread apart and form a ring or upward-projecting rim around the upper edge of the vessel, substantially as and for the purpose described.

4. In combination with a tea-kettle, A, or equivalent culinary vessel, provided with a pocket, i, the detachable shelf G, with its supporting leg or brace H hinged to the edge of the shelf, substantially as and for the purpose described.

5. The improvement in protecting the corners or inside angles of tin vessels, the same consisting in laying a wire, or other metallic strip, o, in the angle, and securing it with solder, substantially as described.

6. An inside angle-protecting wire, o, combined with an outside base or foot wire, s, both wires being secured by a metal strip or loop, V, the loops of the two wires being placed opposite each other and secured by rivets, and afterward soldered, substantially as and for the purpose described.

AZMAN JOHN LOWELL.

Witnesses:
GEO. H. STRONG,
CHAS. G. PAGE.